Patented Feb. 28, 1928.

1,660,661

UNITED STATES PATENT OFFICE.

HOBART H. WILLARD, OF ANN ARBOR, AND MATTHEW GREEN, OF DETROIT, MICHIGAN, ASSIGNORS TO PARKER RUST-PROOF COMPANY, OF DETROIT, MICHIGAN, A CORPORATION OF MICHIGAN.

RUSTPROOFING MATERIAL AND PROCESS OF MAKING THE SAME.

No Drawing. Application filed May 10, 1926. Serial No. 108,161.

This application relates to a rust-proofing material and a method of making the same. More particularly, this application relates to a rust-proofing material consisting largely of manganese dihydrogen phosphate, and to a process of making the same.

The process of rust-proofing an iron article by forming on the surface thereof a coating of insoluble phosphates is well known. It has been discovered that a high percentage of phosphate of manganese in the coating results in a particularly efficient rust-proofing coating. The more particular advantages of this coating are set forth with greater particularity in our co-pending application Serial No. 108,162. The present application is directed to a rust-proofing material which will result in a coating high in manganese, and to a method of making this material.

A material containing a large percentage of manganese dihydrogen phosphate, when dissolved to form a rust-proofing bath, results in a bath which produces a coating high in manganese. It is the object of the present invention to furnish such a material in a commercially feasible manner. The method of manufacture which is preferred under present commercial conditions will be described first, and then some possible variations will be mentioned.

Under present commercial conditions the most satisfactory source of manganese is a grade of ferro-manganese comprising about 80% manganese, 6% to 10% iron, and the rest of other impurities, principally carbon, sulphur and silica. A quantity of finely divided ferro-manganese is dissolved in a strong solution of phosphoric acid, a 65% solution being found satisfactory.

The material is heated to begin the reaction, which is exothermic. There should be sufficient acid to dissolve all of the ferro-manganese, a proportion by weight of ten parts of 65% acid to 1 part of ferro-manganese having been found satisfactory. The solution is kept hot until the reaction is completed, heat, in addition to that released by the reaction, being applied, if necessary.

The solution should be kept agitated during the reaction. The manganese is dissolved, forming dihydrogen phosphate. Iron is similarly dissolved, forming ferrous dihydrogen phosphate. Carbon and silica are not dissolved. Sulphur, present as an impurity, unites with hydrogen given off during the reaction, and passes off as a gas.

After the reaction is complete, it is preferable to filter the solution. Carbon and silica are merely inert substances and do no particular harm in the finished rust-proofing material; but it is preferable to remove these materials to avoid useless handling and keep the finished composition more nearly uniform. Some of the metal is apt to become encrusted with insoluble materials and so remain undissolved. If this remains in the material, it is apt to be exposed during subsequent handling, and in the rust-proofing bath the strength of the solution is needlessly consumed in rust-proofing such metal particles. The removal of any such residuary undissolved metal is one of the chief objects in filtering.

After the solution has been filtered, it is cooled down, and much of the phosphate crystallizes. The crystals are removed, and the mother liquor may be returned for use in the dissolving tank.

The set crystals are preferably thoroughly exposed to the air during drying. Damp crystals of ferrous dihydrogen phosphate readily oxidize when exposed to the air, and become insoluble. Manganese phosphate does not oxidize upon exposure to the air. It follows that exposure of the crystals to the air during drying results in a product which contains little that is soluble in a rust-proofing bath except manganese dihydrogen phosphate.

The dried crystals may be placed in water, the manganese phosphate dissolved, the insoluble ferric phosphate removed, and the solution re-crystallized to produce substantially pure manganese dihydrogen phosphate but this is not necessary for rust-proofing purposes, as the rust-proofing bath is affected only by the material which dissolves therein, so that ferric phosphate in the product does not affect the rust-proofing operation.

If pure manganese could be procured cheaply, it would be used instead of ferro-manganese, and it is possible to form the dihydrogen phosphate of manganese by dissolving other materials in phosphoric acid. Among these other materials may be mentioned carbonate of manganese, normal manganese phosphate and alloys of manganese other than ferro-manganese. In fact, any material may be used which is soluble in phosphoric acid to produce manganese dihydrogen phosphate without introducing foreign materials which will be hard to remove and will be detrimental in the rust-proofing bath, such as sulphuric acid, chlorine, etc. But commercial conditions render ferro-manganese the best available material as a source of manganese, and the method described results in a product which is the practical equivalent of that which would be produced by dissolving pure manganese.

The ferrous phosphate may be oxidized to varying extents and in different ways, and various obvious modifications of the above described process and the resulting product may be made within the scope of the appended claims.

What we claim is:

1. A rust-proofing material consisting of a granular or powdery substance, the major portion of which is manganese dihydrogen phosphate.

2. A rust-proofing material consisting of a granular or powdery material partially soluble in water and in a dilute solution of phosphoric acid, the major part of the portion which is thus soluble consisting of manganese dihydrogen phosphate.

3. A granular or powdery rust-proofing material comprising soluble acid phosphates of manganese and phosphates of iron, a considerable portion of the phosphates of iron being insoluble in water and in a dilute solution of phosphoric acid.

4. The process of making a rust-proofing compound, consisting in dissolving iron and manganese in a solution of phosphoric acid, the phosphoric acid in the solution being in excess of that required to combine with the iron and manganese to form ferrous and manganous dihydrogen orthophosphate, crystallizing the phosphates, removing the crystals from the mother liquor and drying the crystals under oxidizing conditions.

5. The process of making a rust-proofing compound, consisting in dissolving iron and manganese in a solution of phosphoric acid, the manganese being in excess of the iron, the phosphoric acid in the solution being in excess of that required to combine with the iron and manganese to form ferrous and manganous dihydrogen orthophosphate, crystallizing the phosphates, removing the crystals from the mother liquor, and drying the crystals under oxidizing conditions.

6. The process of making a rust-proofing compound, which consists in dissolving ferro-manganese in phosphoric acid to form dihydrogen phosphate of manganese and of iron, and oxidizing ferrous phosphate in the resulting product to form insoluble ferric phosphate.

In testimony whereof, we have hereunto signed our names to this specification.

HOBART H. WILLARD.
MATTHEW GREEN.